US010616813B2

(12) United States Patent
Karlsson (10) Patent No.: US 10,616,813 B2
(45) Date of Patent: Apr. 7, 2020

(54) WIRELESS COMMUNICATION SYSTEM FOR VEHICLES USING BOTH TRACKSIDE WLAN AND CELLULAR NETWORK COMMUNICATION (71) Applicant: ICOMERA AB, Göteborg (SE)

(72) Inventor: Mats Karlsson, Göteborg (SE)

(73) Assignee: ICOMERA AB, Gothenburg (SE)

(*) Notice: Subject to any disclaimer, the term of this patent is extended or adjusted under 35 U.S.C. 154(b) by 0 days.

(21) Appl. No.: 15/649,016

(22) Filed: Jul. 13, 2017

(65) Prior Publication Data
US 2018/0027465 A1 Jan. 25, 2018

(30) Foreign Application Priority Data

Jul. 22, 2016 (SE) .................. 1651081

(51) Int. Cl.
H04W 4/00 (2018.01)
H04W 36/14 (2009.01)
(Continued)

(52) U.S. Cl.
CPC ............ *H04W 36/14* (2013.01); *H04L 47/24* (2013.01); *H04L 67/02* (2013.01); *H04L 67/12* (2013.01);
(Continued)

(58) Field of Classification Search
CPC combination set(s) only.
See application file for complete search history.

(56) References Cited

U.S. PATENT DOCUMENTS 7,061,860 B1  6/2006 Calvignac et al.
2004/0111461 A1  6/2004 Taylor et al.
(Continued)

FOREIGN PATENT DOCUMENTS

EP  1 175 757 B1  1/2005
EP  1 816 802 A1  8/2007
(Continued)

OTHER PUBLICATIONS

Swedish Office Action dated Jan. 19, 2017, issued in corresponding Swedish Patent No. 1651081-0. (pp. 9).
(Continued)

Primary Examiner — Stephen M D Agosta
(74) Attorney, Agent, or Firm — Buchanan Ingersoll & Rooney P.C.

(57) ABSTRACT

A method and system for wireless communication between a mobile router in a moving vehicle, such as a train, and one or several external server(s) via at least two types of external wireless networks, a first external wireless network type, trackside network, including a plurality of trackside base stations, such as access points, for communication in compliance with a Wireless Local Area Network (WLAN) standard, said trackside base stations being arranged in the vicinity of a vehicle path of travel, and a second external wireless network type, cellular network, communicating via cellular network standard(s), such as in accordance with 3G, 4G or 5G standards, wherein the mobile router is arranged, at least periodically, to simultaneously communicate with the two types of external wireless networks thereby providing at least two concurrently useable external wireless networks.

5 Claims, 4 Drawing Sheets (51) Int. Cl.
*H04W 92/12* (2009.01)
*H04L 12/851* (2013.01)
*H04L 29/08* (2006.01)
*H04W 36/16* (2009.01)
*H04L 12/707* (2013.01)
*H04W 84/00* (2009.01)
*H04W 84/04* (2009.01)
*H04W 84/12* (2009.01)
*H04W 88/10* (2009.01)

(52) U.S. Cl.
CPC ......... *H04W 36/165* (2013.01); *H04W 92/12* (2013.01); *H04L 45/24* (2013.01); *H04W 84/005* (2013.01); *H04W 84/042* (2013.01); *H04W 84/12* (2013.01); *H04W 88/10* (2013.01)

(56) References Cited

U.S. PATENT DOCUMENTS

| | | |
|---|---|---|
| 2004/0170181 A1 | 9/2004 | Bogdon et al. |
| 2009/0180430 A1 | 7/2009 | Fadell |
| 2009/0219900 A1 | 9/2009 | Kokkinen et al. |
| 2009/0282469 A1* | 11/2009 | Lynch ................... H04W 12/06 726/11 |
| 2012/0213114 A1* | 8/2012 | Chen ..................... H04L 1/0002 370/252 |
| 2012/0224484 A1* | 9/2012 | Babiarz ............... H04L 41/5019 370/235 |
| 2012/0275445 A1* | 11/2012 | Karlsson ............... H04W 8/183 370/338 |
| 2013/0201316 A1* | 8/2013 | Binder .................... H04L 67/12 348/77 |
| 2014/0003335 A1* | 1/2014 | Roy ........................ H04L 69/14 370/328 |
| 2014/0136589 A1* | 5/2014 | Wahler ............. H04L 29/08144 709/201 |
| 2014/0149547 A1 | 5/2014 | Barker |
| 2015/0029987 A1* | 1/2015 | Addepalli ............. H04W 4/046 370/329 |
| 2016/0150451 A1 | 5/2016 | Barreto De Miranda Sargento et al. |

FOREIGN PATENT DOCUMENTS

| | | |
|---|---|---|
| EP | 1 912 385 A1 | 4/2008 |
| EP | 2 739 089 A1 | 6/2014 |
| WO | 2004/021206 A1 | 3/2004 |
| WO | WO 2007/063168 A1 | 6/2007 |
| WO | 2008/101255 A1 | 8/2008 |
| WO | WO 2015/169917 A1 | 11/2015 |
| WO | WO 2016/068781 A1 | 5/2016 |

OTHER PUBLICATIONS

Swedish Search Report dated Jan. 19, 2017, issued in corresponding Swedish Patent No. 1651081-0. (pp. 3).

Extended European Search Report dated Nov. 30, 2017, issued by the European Patent Office in corresponding European Application No. EP 17178444.0 (9 pages).

* cited by examiner

WIRELESS COMMUNICATION SYSTEM FOR VEHICLES USING BOTH TRACKSIDE WLAN AND CELLULAR NETWORK COMMUNICATION

TECHNICAL FIELD OF THE INVENTION

The present invention relates to a wireless communication method and system for moving vehicles, such as trains, and in particular a method/system allowing more efficient communication to and from the moving vehicle, and in particular a method/system for wireless communication between a moving vehicle and remote servers through at least one external mobile network.

BACKGROUND

The demands on wireless communication capabilities in today's society are increasing rapidly. In particular, fast and easily accessible communication is desired through hand-held devices over large areas. It is particularly challenging to achieve such communication for mobile devices which are moving, e.g. when moving over large distances with poor network coverage or when affected by unknown sources of noise interrupting a signal for communication, such as clients moving on e.g. trains, airplanes, and other types of moving vehicles. In particular, if a client, such as a mobile phone, moves over large areas the client has to connect to several base stations in order to maintain a sufficient connection for communication.

Further, e.g. train carriages are made of metal, and even the windows are normally covered with a metal film. Accordingly, train carriages are shielded compartments, and direct communication between terminal antennas within the carriages and externally located antennas is difficult to obtain.

The mobile nature of a client with respect to the base stations may also introduce several potential sources of communication performance degradation. Such sources may derive from complex terrain, competition for available channels, or the source may be an unknown source of noise related to e.g. radio-frequency interference.

At the same time, there is today an increasing demand from passengers to be able to communicate through mobile phones and other handheld terminals when travelling on e.g. trains, and also to be able to get access to the Internet with laptops, PDAs etc. Further, with the new smartphones, and the way these are used, with e.g. continuously operating applications, many phones are active at all times, meaning that many handovers are required when the train moves. Even though this problem is common for all moving vehicles, it is especially pronounced for vehicles moving at high speed, such as trains and airplanes, and trains are in addition facing problems with poor line-of-sight between the base stations and the train. This puts a strain on the wireless network infrastructure, leading to poor performance.

To this end, it is known to provide a mobile access router for data communication, also connected both to an external antenna and an internal antenna, in each carriage, in order to provide Internet access on board the vehicle. Such mobile access router solutions are e.g. commercially available from the applicant of the present application, Icomera AB, of Gothenburg, Sweden, and are also disclosed in EP 1 175 757 and WO 15/169917 by the same applicant. This method has greatly improved the reliability of high-bandwidth wireless communication for trains and other large vehicles.

However, this solution may still be insufficient to obtain an optimal transmission performance, especially for large data volumes. Trains and other moving vehicles often pass through areas with bad radio coverage, and present solutions are often unable to handle the required traffic. Further, the data traffic using cellular network communication, such as over 3G or 4G, is relatively costly.

Further, it is known to communicate with trains and other vehicles through dedicated base stations arranged sequentially along the rail track, and with a certain distance apart. Such base stations are generally referred to as trackside base stations or trackside access points, and typically operates with e.g. WLAN. However, trackside base stations may also operate in accordance with other protocols or standards, such as unlicensed LTE, licensed LTE, GSM-R, etc. However, trackside networks are extremely costly to implement, since the base stations need to be very close to each other, thereby requiring a very large number of base stations arranged close to the railway or road, and relatively evenly distributed. Thus, on the one hand trackside base stations cannot be arranged too far away from each other, since the performance deteriorates rapidly when the distance increases, however, on the other hand, closely arranged trackside base stations interfere with each other, making efficient communication problematic. Thus, implementation of trackside networks requires huge investments, and takes very long time. Despite this, it may still be difficult to obtain good coverage over the entire railway or road, and the communication performance may still be poorly and inadequate. The high costs are primarily related to the close arrangement of the base stations/access points, costs for building rather high radio towers, power to operate the base stations/access points and provision of fiber/radio link connections to the trackside network, such as the internet or a company specific networks. Thus, known trackside communication systems are very costly both to install and to operate.

There is therefore a need for an improved method and system for communicating with moving vehicles, and in particular trains, allowing increased capacity, capacity utilization, quality and/or cost-efficiency. Even though the above discussion is focused on trains, similar situations and problems are encountered in many other types of moving vehicles, and in particular moving passenger vehicles, such as buses, ships and airplanes.

SUMMARY OF THE INVENTION

It is therefore an object of the present invention to provide a method for wireless communication and a wireless communication system for moving vehicles, and in particular a train, which alleviates all or at least some of the above-discussed drawbacks of the presently known systems.

This object is achieved by means of a wireless communication method and system for a moving vehicle, such as a train as defined in the appended claims.

According to a first aspect of the present invention, there is provided a method for wireless communication between a mobile router in a moving vehicle, such as a train, and one or several external server(s) via at least two types of external wireless networks, a first external wireless network type comprising a plurality of trackside base stations, such as access points, for communication in compliance with a Wireless Local Area Network (WLAN), said trackside base stations being arranged in the vicinity of a vehicle path of travel, such as a train route, and a second external wireless network type communicating via cellular network standard (s), such as in accordance with 3G, 4G or 5G standards, wherein the mobile router is arranged, at least periodically, to simultaneously communicate with the two types of external wireless networks thereby providing at least two concurrently useable external wireless networks, the method comprising:

identifying for data streams to or from said mobile router a data communication type for said data stream, said data communication type being selected from a set of at least two different data communication types, each data communication type being associated with a specific prioritization;

determining, preferably in real-time, the availability of external wireless network(s) of the first of said external wireless network types, and, when good availability of such external wireless network(s) has been determined, allowing communication through this external wireless network(s) for all different data communication types with no or limited restrictions, and when it has been determined that such an external wireless network(s) of the first external wireless network type is not available, allowing communication through external wireless network(s) of said second external network type based on prioritization, wherein data streams of highest priority are allowed with no restrictions, whereas data streams of lower priority are restricted or prohibited.

The present invention is based on the understanding that while providing WLAN access or the like with trackside base stations over entire routes is extremely cumbersome and expensive, it is relatively inexpensive to provide WLAN access or the like with trackside base stations over part of most routes, such as covering between 1-90%, such as 5-70%, 5-50% or 5-25%. By means of the present invention, data streams with high priority, such as voice communication (VoIP and the like), are allowed with limited or no restrictions also over the second external wireless network type communicating via cellular network standard(s). Hence, the high priority data communication will work well over the entire route, with high bandwidth, low latency, etc. Data communication of lower or low priority will mostly be forwarded on the trackside network, whereas communication over the cellular network will be restricted or even prohibited. Data communication of lower priority may e.g. be streaming video, downloading of web pages, etc. Such low priority data communication normally amounts to the greater part of the total amount of data communication, but is less sensitive to higher latency and the like. Further, the low priority data communication may also be buffered at the router, making short interruptions in the data communication essentially unnoticeable for the user.

Hence, in this way, a trackside network which does not cover the entire route, and which may even have a relatively poor coverage, may still forward a significant amount of the overall data communication to and from the moving vehicle. This makes the data communication very cost-effective, and saves the resources and capacity of the cellular network to where it is really needed. Thus, the LTE network is not choked with streaming video and the like, and the capacity is saved for prioritized data communication, such as voice communication. Further, drawbacks for the clients onboard the train, in terms of e.g. longer latency, are hardly noticeable, and are insignificant.

When building trackside networks, the costs increase exponentially towards the end when attempting to provide 100% coverage. It has been found that when building a trackside network with 100% coverage, the last 20% will cost 80% of the total costs for the trackside network. By means of the present invention, it becomes possible to build trackside networks only in areas where it is reasonable and affordable, in a very cost-effective way, and still use this trackside network for the bulk of the data traffic, and with no or very limited negative consequences for the user compared to if a trackside network with 100% coverage had been provided.

Such trackside networks with limited coverage can also be built and set-up very quickly compared to trackside networks with full coverage, and can also easily be complemented further over time, to provide better coverage, if there is need for such better coverage. Thus, the hurdles to implement the present invention are very low, since trackside networks of poor but adequate coverage are already present along many railways and roads, such as in the vicinity of railway stations, or can alternatively be built quickly and to a very low cost. Trackside base stations can e.g. easily and advantageously be located in positions where there is already access to optical fibers or the like, and a suitable distance from the railway or road, such as within a distance of 0-1 km from the railway/road, and preferably within a distance of 0-0.5 km. For railways and roads extending over areas with much population, there will already be a plethora of such suitable positions. It is also possible to connect trackside base stations positioned within close range from the railway/road to optical fibers or the like being farther away by e.g. radio link connections. In this way, trackside base stations may be connected to optical fibers which are e.g. within a range of 0.5-10 km or more from the railway or road.

At the same time, areas where it is difficult to build trackside network, such as where the terrain makes it difficult, where it is difficult to obtain building permits, where it is far to the closest optical backbone connection, etc, can by means of the present invention be left without trackside network coverage, since the prioritized data communication will anyway be allowed over the cellular network.

A dedicated trackside network gives a very high capacity/bandwidth to the train/vehicle. When the initial investment is done the train/vehicle has more capacity than the onboard customers and services can use. You don't need to have any bandwidth restrictions to the customers or applications. Thus, the trackside network has a high initial investment, but when built, high data volume, high bandwidth usage does not increase the running cost for the trackside network. When the train/vehicle are connected to the trackside network it is of advantage to use this as much as possible. By means of the present invention, the majority of the data streams can be forwarded through the trackside network, with very limited noticeable drawbacks for the users.

Cellular network, such as 4G and 5G networks, on the other hand have low initial investment, since the system is using the commercially available cellular networks, but high data volume, high bandwidth is available to a substantial cost since the cost is normally dependent on the volume, and the cellular network capacity is normally lower than for dedicated trackside network.

By means of the present invention, it is possible to efficiently restrict the usage of the cellular networks in an optimal way, but without lowering the onboard Internet service too much. This is lowers the overall costs, and also ensures that the limited available capacity of the cellular networks is used where it is most needed.

Building 100% coverage on the trackside network is normally expensive, some tower installations are cheap, have easy access to fiber and power, on other locations fiber/network and power access are impossible or costs are very high, with need for radio links and solar/diesel powered system and the like. These remote areas in most cases have adequate cellular network coverage and capacity. By only building trackside networks where it's cheap and easy or as a complement where there is no cellular network coverage at all (even if, at those places, it may be quite costly) and by efficiently distributing the data streams between these network types in accordance with the invention, it is possible to combine the strengths of both networks. This is done by limiting the maximum bandwidth per passenger and or per application and blocking certain bandwidth demanding services when only in cellular coverage, and allowing high bandwidth to all types of data streams when in coverage of the trackside network. Hereby, high bandwidth internet access is allowed to the passengers and also all bandwidth demanding services.

A combined solution with partially trackside coverage that is built where it's cheap give a big advantage, when utilized in accordance with the present invention. When in trackside coverage your bandwidth demanding services will be updated regularly, but when only in cellular coverage these services will be blocked. The onboard service for a passenger/onboard applications will be seen nearly as good as a high bandwidth unrestricted network. Your Windows update, iCloud, Dropbox etc will be downloaded and updated when in trackside coverage.

This solution by only building partially coverage will lower the investment costs and the cost for cellular data and increase the system performance. If you e.g. build 50% trackside coverage you might download 90% of the data to the train/vehicle over the trackside network. This combined network solution can lower overall system investment and running cost and increase the system performance.

The control of the data transfer in accordance with the present invention may be implemented e.g. as software in the router onboard the vehicle, that dynamically can change service and network preferences/settings depending on what network technology that is used.

The "router" or "mobile router" is a networking router, which is a machine that forwards data packets between computer networks, on at least one data link in each direction. The router may be a mobile access router, and preferably a mobile access and applications router. The router preferably comprises means for determining the data communication type of a stream of wireless data packets received by the router, such as if the data stream corresponds to a prioritized VoWIFI call, the means being for example appropriate hardware and/or software, from here on referred to as a control unit. The identification step can be performed on a stream of wireless data packets received from a client onboard the public transport vehicle, or from a remote server outside the vehicle.

An internal LAN may be provided inside the public transport vehicle for providing wireless communication between the router and at least one client onboard. The at least one client onboard may accordingly be connected to said router via a LAN (local area network) provided by one or more wireless access points within the public transport vehicle. Preferably, at least one such wireless access point is provided in each carriage. All wireless access points may be connected to a single, central router, arranged in one of the carriages of a train. However, each carriage in the train may also be provided with a separate router connected to at least one wireless access point, where the wireless access point may be external to the router or an integrated function of the router.

The method is preferably executed by a controller, being part of or connected to mobile router on-board the train, or alternatively being part of or connected to the exterior mobile network(s), and in communication with the trackside base stations. The method can be implemented and realized solely or to a large extent in software, but may also, to some extent or even completely be realized in hardware.

In a preferred embodiment, the vehicle route/path is predetermined and the external wireless network comprising a plurality of trackside base stations, such as trackside access points, distributed along a vehicle path of travel, and located along the predetermined route. The coverage of each trackside base station is inter alia dependent on the height of the antenna of the cell, the height of the vehicle, the maximum, minimum or average distance between the vehicle and the antenna, and the frequency of communication. Preferably, the trackside base stations are operated at about 5 GHz but can operate in any frequency available, 2.4 GHz, 3.5 GHz and others.

The system may comprise a plurality of masts, each mast having at least one antenna structure or construction mounted thereupon. Each antenna structure or construction may be coupled to a respective, separate base station/access point for communication with the vehicle-based mobile router, although in some embodiments, multiple antenna structures or constructions on the same mast may be coupled to the same base station/access point, or provide two or more base stations/access points. The base stations/access points may be connected to each other, to a network backhaul using e.g. an optical fiber system.

The communication between the trackside base stations and the mobile router is preferably made in compliance with a WLAN standard, and most preferably in compliance with the IEEE 802.11 standard (which may also be referred to as WiFi). However, it is also possible to use other wireless communication protocols/technologies. For example, trackside base stations may also operate in accordance with other protocols or standards, such as unlicensed LTE, licensed LTE, GSM-R, etc.

The determining, preferably in real-time, of the availability of external wireless network(s) of the first of external wireless network types, i.e. the trackside, WLAN network, corresponds to determining whether the mobile router is within the access area of any of the trackside base stations. This can be made by signal detection in the trackside base stations and/or in the mobile router, and by forwarding information regarding this to the controller. However, alternatively or additionally, this determination can also be made based on GNSS (Global Navigation Satellite System) signals, such as GPS signals, received by the mobile router. In this case, exact position data can be communicated to the controller, and by knowing the positioning and coverage areas of the trackside base stations, the controller can determine in which coverage area(s) the mobile router is present. Further, the controller may predict this based on the timing and sequence of base stations in which the mobile router has been previously.

Similarly, the direction of travel for the vehicle may be determined in various ways. For example, the positioning data received by GNSS/GPS signals in the mobile router may be used to this end, the sequence of trackside base stations in the coverage areas of which the mobile router has been may be used, etc.

In a preferred embodiment, the mobile routers are arranged to receive GNSS/GPS data, and communicate this to the external mobile network, said GNSS/GPS data being useable to detect the presence of the mobile router within the access area of any of said plurality of trackside base stations.

Preferably, the controller comprises or is connected to a database comprising data at least about the identity of the trackside base stations and the positioning of the trackside base stations, and optionally also about the coverage area of the trackside base stations in relation to the vehicle path.

The trackside base stations/access points may at least at some locations be arranged so that there is at least some overlap between the coverage areas for neighboring trackside base stations. When a vehicle travels through this overlap area, a conventional handover may be performed from the previously passed trackside base stations to the trackside base stations ahead of the vehicle. Alternatively or additionally, the overlapping coverage areas can be used to enable simultaneous communication with more than one trackside base stations. Thus, the mobile router can preferably be arranged to simultaneously communicate with the external trackside network through at least two trackside base stations when more than one trackside base stations is accessible for the mobile router, thereby providing at least two concurrently useable external wireless networks. This enhances the communication performance significantly, and also alleviates the problems related to handovers.

The mobile router may be arranged to communicate with the cellular network, i.e. the second external wireless network, only when there is no access to the trackside network, i.e. the first external wireless network. However, the mobile router may alternatively simultaneously communicate with at least one second external wireless network, thereby providing at least one further concurrently useable data link.

When several external wireless networks of the same type are available, the mobile router is preferably arranged to evaluate the quality of said external wireless networks, e.g. on a host layer and e.g. by repeatedly sending requests arranged to trigger a determinable automated response to said stationary communication server via said external wireless network and measure the time until the triggered automated responses are received; and assigning data streams to said external wireless network at least partly based on said evaluated quality.

Further, the mobile router in the moving vehicle may be arranged to receive and transmit wireless data packets to and from a stationary communication server outside the moving vehicle through the at least one exterior mobile network via at least one antenna, and to and from at least one client onboard the moving vehicle.

When the router is arranged to communicate with the communication server on at least two different external wireless networks (communication routes) having different characteristics, the router may be arranged to automatically separate the communication traffic between said external wireless networks based on an evaluation of the quality. The data streams may then be forwarded on one or several links to and from a dedicated external server, which may be referred to as an aggregation server or gateway. The different links thereby form a single virtual link between the router and the gateway.

The communication can be automatically optimized based on the evaluation, and also optionally on other conditions, such as price, speed, latency, etc. Thus, in addition to the evaluation, prioritizing and assignments may be made based on other static or dynamic parameters, such as signal strength and the like. Such further optimizations are per se known from EP 1 175 757 and WO 15/169917 by the same applicant, said documents hereby being incorporated by reference. An automatic selection is then made among the available external wireless networks to use the most efficient combination. Hence, a seamless distribution of the data among the different external wireless networks is obtained.

The router may, in addition to the trackside, WLAN (or other protocol used for the communication with the trackside base stations), use any available external wireless networks, such as GSM, Satellite, DVB-T, HSPA, EDGE, 1×RTT, EVDO, LTE, Wi-Fi and WiMAX; and optionally combine them into one virtual network connection. In particular, it is preferred to use external wireless networks provided through wireless wide-area network (WWAN) communication technologies.

The selection of links is preferably made once for each data stream. However, re-selection for data streams that have failed may also be made. Further, data streams may also be split among two or more external wireless networks, e.g. by transferring a first part of a data stream on one data link to begin with, and then continue the transfer of the rest of the data stream on another data link, based on a re-assignment decision. Re-selection and/or re-assignment may also be made based on other criteria than complete failure of the presently used data link, such as when the evaluated quality of the link presently used is significantly deteriorated, falls below a certain threshold, or the like.

The step of identifying a data communication type for data communication is preferably made for each data stream. The data communication types may be only two—prioritized and non-prioritized—but three or more data communication types may also be used, such as high priority, medium priority and low priority.

Data streams corresponding to voice traffic would typically fall under the category "prioritized" or "high priority", whereas streaming video would typically fall under the category "non-prioritized" or "low priority". VPN data streams may be assigned to "prioritized" or "high priority" or "middle priority", whereas http data streams may be assigned to "non-prioritized" or "middle priority" or "low priority".

Thus, the step of identification of data type may involve determination of if a stream of wireless data packets received by said router corresponds to at least one of a VoIP (Voice over IP) stream and a VoWIFI (Voice over Wi-Fi) stream. VoWIFI may also be referred to as Wi-Fi calling, or GAN/UMA (Generic Access Network or Unlicensed Mobile Access). VoWIFI is in the present context to be understood as a solution whereby mobile service providers can deliver the same set of mobile voice and messaging services they currently offer over their macro cellular network, over any Wi-Fi network, globally. In short, it can be said that the cellular world has two separate core networks, called CS (circuit switched) that was used for voice and PS (packet switched) for data. As operators moved more and more voice communication over to the PS part two new terms evolved, Voice over HSPA/3G (VoHSPA) and Voice over LTE/4G (VoLTE), and subsequently it was realized that one can use WiFi to access the PS part of the network, hence, VoWIFI.

The VoWIFI is preferably used in accordance with the IEEE 802.11 standard, and may also be referred to as voice over WLAN (VoWLAN), but other wireless internet networks may also be used.

In more detail, VoWIFI enables the user to make standard phone calls over Wi-Fi. This is done by routing the call traffic through the Wi-Fi connection, instead of over the air to a cell tower. In VoWIFI the user dials the number, and places the call in a conventional way, just like in a circuit switched environment. However, the difference is that the call connects over Wi-Fi, and is transferred in data packets, and is subsequently injected back into the cellular network as if the call had been beamed over the air. Furthermore, an increasing number of smart phone providers are providing built-in support for Evolved Packet Core (EPC) integrated Wi-Fi calling support as part of their device fleet. This provides users with native Wi-Fi calling experience without any need to download a specific software application, but instead users can continue to use the built-in phone dialer and continue to be reached on their phone number. Unlike services like Skype, Viber, WhatsApp and other Over the Top (OTT) Voice over IP (VoIP) applications, which place calls using call forwarding or an internet-based interface, VoWIFI lets the user use the ordinary carrier phone number over the internet. VoWIFI is also distinct from VoIP technology in that VoIP transfers the voice over the internet to the switched telephone network, whereas VoWIFI connects the voice traffic to the mobile carrier's network using the internet instead of cell towers. A wireless communication system capable of transferring voice communication via VoWIFI between at least one mobile terminal and an exterior mobile network is disclosed in the pending and still unpublished Swedish patent application No. 1451302-2, by the present applicant, said document incorporated herein by reference in its entirety.

Therefore, in accordance with an exemplary embodiment of the present invention the step of determining, in the router, if a stream of wireless data packets from the at least one client on board the public transport vehicle corresponds to at least one of a VoIP stream and a VoWIFI stream comprises:

determining at least one of a source, a destination, a size and pattern of the stream of wireless data packets, and using this for identification if the stream of wireless data packets corresponds at least one of a VoIP stream and a VoWIFI stream. In addition to, or as an alternative, the step of determining if a stream of wireless data packets from the at least one client on board the public transport vehicle corresponds to at least one of a VoIP stream and a VoWIFI stream comprises identification of a data packet type or data stream type for the stream of wireless data packets based on deep packet inspection.

The concept of analyzing packet size and shape of various packet streams in order to identify and determine the data stream type, as such, is per se known, and often utilized in traffic shaping or packet shaping. Traffic shaping techniques can be found in e.g. US2005/0172008, EP1912385, U.S. Pat. No. 7,061,860, US2004/0111461, Adaptiband™ by XRoads Networks, Radware's Deep Flow Inspection™, and NAVL by Procera Networks, all of which are hereby incorporated by reference. However, as far as is presently known, this has never been used on public transport vehicles, and in particular not for the same purposes as in the present invention. It has now been realized by the present inventors that these various ways of determining a type of data stream can be used to improve the travelling experience and increase passenger satisfaction on public transport vehicles. Furthermore the present invention enables communication networks onboard public transport vehicles to be much more compatible with on-going technological trends such as VoLTE, VoWIFI, etc.

The present invention is based on the realization that data communication of different types have different needs, which varies greatly, and by treating such data communication differently, great savings and much increased performance can be obtained. For example, an individual HTTP request is relatively insensitive to latency. Furthermore, HTTP traffic constitutes a large portion of passenger traffic. Therefore, excluding or restricting all HTTP traffic from the cellular network is highly beneficial. At the other end of the spectrum, a VPN connection is likely to be lengthy and sensitive to perturbations. VPN connection data streams would therefore be among the prioritized types of data communication.

The automatic analysis of data streams, for the purpose of identifying the data communication type can take place by a variety of means, as discussed below.

Identification of data communication type may comprise determining whether the data communication involves a HTTP communication, and to assign this to a data communication type having a low or moderate priority. Additionally or alternatively, the identification may comprise determining whether the requested resource involves a TCP communication a destination port of 80, and to assign this to a data communication type having a low or moderate priority. The same may apply to HTTPS communication, using a destination port of 443, and this data communication type may also be assigned low or moderate priority. Additionally or alternatively, the identification may comprise determining whether the requested resource involves a VPN communication, and to assign this to a data communication type having high priority.

Preferably, the identification comprises determining if the data communication is at least one of voice-over-IP (VOIP) and VPN, and to assign this to a data communication type with high priority. The data stream type may e.g. be determined based on deep packet inspection.

However, the identification of a data communication type can be made in many different ways, such as based on packet size and pattern of a packet stream. Additionally the match may depend on a source and a destination of the wireless data packets. For example, it is possible to determining if the packet stream is related to web browsing, e-mailing, computer gaming, media-streaming, such as video, voice over IP (VoIP), VPN communication, etc. For example, a stream of small packets every 15-25 milliseconds in both directions can with high probability be recognized as a VoIP call.

Thus, the step of identifying a data communication type preferably comprises determining at least one of a source, a destination, a size and pattern of the wireless data packets, and using this for identification of a data communication type. In particular, it is of interest to identify if the data packet is a video data packet, and to assign such data communication to a data communication type having low priority. Since video, e.g. in streaming services, is normally responsible for a very large part of the data traffic, restricting or prohibiting such data communication over the cellular network is highly beneficial. It may, additionally or alternatively, be of great interest to identify data communication types which are most in need for good quality and high bandwidth at all times, and to grant access for such communication via the cellular network. Such packet types to be prioritized are e.g. voice-over-IP (VOIP) data packets and a VPN data packets.

The availability of the external wireless network(s) of the first type, i.e. the trackside, WLAN network(s), can be determined to be either on or off. In this case, all data communication types will be allowed in the "on" state, with no or limited restrictions, whereas only data communication of highest priority will be allowed with no restrictions in the "off" state, data communication of lower priority being restricted or prohibited.

However, the availability of the trackside, WLAN network(s) can also be determined more finely, e.g. in three or more states. E.g. the "on" state may comprise "on with low capacity" and "on with high capacity". For example, "on with low capacity" may be where the throughput is less than 100 Mb/s, and "on with high capacity" may be where the throughput is more than 100 Mb/s. In such cases, data communication for data communication types having lower priority may be more restricted in the "on with low capacity" state than in the "on with high capacity" state.

In a quick and relatively simple, but yet highly efficient, embodiment, the step of identifying a data communication type comprises comparing at least one of a destination address of said data stream and an output port of said data stream with a whitelist comprising at least one predefined address or port, and assigning a higher priority to said data streams in case of a match. This provides an alternative or additional means for determining if a stream of wireless data packets corresponds to a prioritized data communication type, such as at least one of a VoIP stream and a VoWIFI stream, as compared to analyzing size and/or shape of the stream. A whitelist is in the present context to be interpreted as a defined list of IP-addresses and/or ports, where data streams associated with these IP-addresses/ports are assigned the highest priority. Such highly prioritized data streams will be allowed with no restrictions, or as few restrictions as possible, both for trackside networks and cellular networks. Preferably the whitelist comprises at least one IP-address associated with e.g. VoWIFI and/or VoIP protocols, e.g. a destination address. The whitelist may also be dynamically and periodically updated. Alternatively, or in addition to IP-addresses and/or ports, the whitelist may comprise a list of web addresses, enabling prioritizing streams when an attempt is made to contact certain web addresses via e.g. a DNS server.

Alternatively, or preferably in addition, the step of identifying a data communication type may comprise comparing at least one of a destination address of said data stream and an output port of said data stream with a blacklist comprising at least one predefined address or port, and assigning a lower priority to said data streams in case of a match. This provides for alternative or additional means for determining if a stream of wireless data packets corresponds to data communication types of lowest priority. A blacklist is in the present context to be interpreted as a defined list of IP-addresses and/or ports, where data streams associated with these IP-addresses/ports are assigned lowest priority. Such data streams may e.g. be blocked when only cellular networks are available, and may also be somewhat restricted on trackside networks. Preferably the blacklist comprises at least one IP-address associated with e.g. streaming video, downloading of files, etc, e.g. a destination address. The blacklist may also be dynamically and periodically updated. Alternatively, or in addition to IP-addresses and/or ports, the blacklist may comprise a list of web addresses, enabling blocking of streams when an attempt is made to contact certain web addresses.

Data communication to be prioritized/whitelisted, may e.g. be voice calls, VPN data streams, etc. Prioritized/whitelisted data streams will be allowed to be transferred over both trackside networks and cellular networks, and preferably without any restrictions.

Data communication of lowest priority, i.e. blacklisted communication, can e.g. be:

Operating system autoupdate services like:
Windows update
Android update
Apple update Automatic cloud storage synchronization services like:
Automatic file synchronization with Apple iCloud
Automatic file synchronization with Microsoft OneDrive
Automatic file synchronization with Google Drive
Automatic file synchronization with Dropbox Such blacklisted communication is allowed on trackside networks, but possibly with some limitations in bandwidth, but are preferably completely blocked from cellular networks.

Data communication of medium priority, i.e. neither being blacklisted nor whitelisted, may be transferred over trackside networks whenever available, but may also be allowed to some degree on cellular networks, but with restricted, throttled bandwidth. Such data communication can e.g. be:

Cloud storage services like:
Manual access of files on Apple iCloud
Manual access of files on Microsoft OneDrive
Manual access of files on Dropbox
Manual access of files on Google Drive Video streaming services like:
Youtube
Netflix
HBO
Vimeo
Twitch According to another aspect of the invention, there is provided a computer-readable storage medium encoded with instructions for executing in a wireless device the instructions, when executed, performing the above-discussed method.

With this aspect of the invention, similar advantages and preferred features are present as in the previously discussed first aspect of the invention.

Thus, when it has been determined that external wireless network(s) of the first of said external wireless network types is available, but with limited capacity, communication through this external wireless network(s) is preferably for all different data communication types, but with restrictions for data communication types having lower priority.

When good availability of such external wireless network(s) has been determined, the external wireless network(s) of said first external network type are preferably primarily or solely used for communication for all different data communication types with no or limited restrictions.

According to a second aspect of the present invention, there is provided a wireless communication system for wireless communication with a mobile router in a moving vehicle, such as a train, via at least two types of external wireless networks, a first external wireless network type comprising a plurality of trackside base stations, such as access points for communication in compliance with a Wireless Local Area Network (WLAN), said trackside base stations being arranged in the vicinity of a vehicle path of travel, such as a train route, and a second external wireless network type communicating via cellular network standard(s), such as in accordance with 3G, 4G or 5G standards, wherein the mobile router is arranged, at least periodically, to simultaneously communicate with the two types of external wireless networks thereby providing at least two concurrently useable external wireless networks, the system comprising a controller, including a processor, and being connected to the mobile router and/or a remote server connected to said external wireless networks, the controller being arranged to:

identify for data communication to or from said mobile router, and preferably for each occurrence of such data communication, a data communication type for said data communication, said data communication type being selected from a set of at least two different data communication types, each data communication type being associated with a specific prioritization;

determine, preferably in real-time, the availability of external wireless network(s) of the first of said external wireless network types, and, when good availability of such external wireless network(s) has been determined, allowing communication through this external wireless network(s) for all different data communication types with no or limited restrictions, and when it has been determined that such external wireless network(s) of the first external wireless network type is not available, allowing communication through external wireless network(s) of said second external network type based on prioritization, wherein data communication of highest priority is allowed with no restrictions, whereas data communication of lower priority is restricted or prohibited.

Also with this aspect of the invention, similar advantages and preferred features are present as in the previously discussed first aspect of the invention.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the detailed embodiments described in the following are related to trains. However, it is to be acknowledged by the skilled reader that the method and system are correspondingly useable on other moving vehicles, such as buses, ferries, airplanes and the like.

Figure 1:
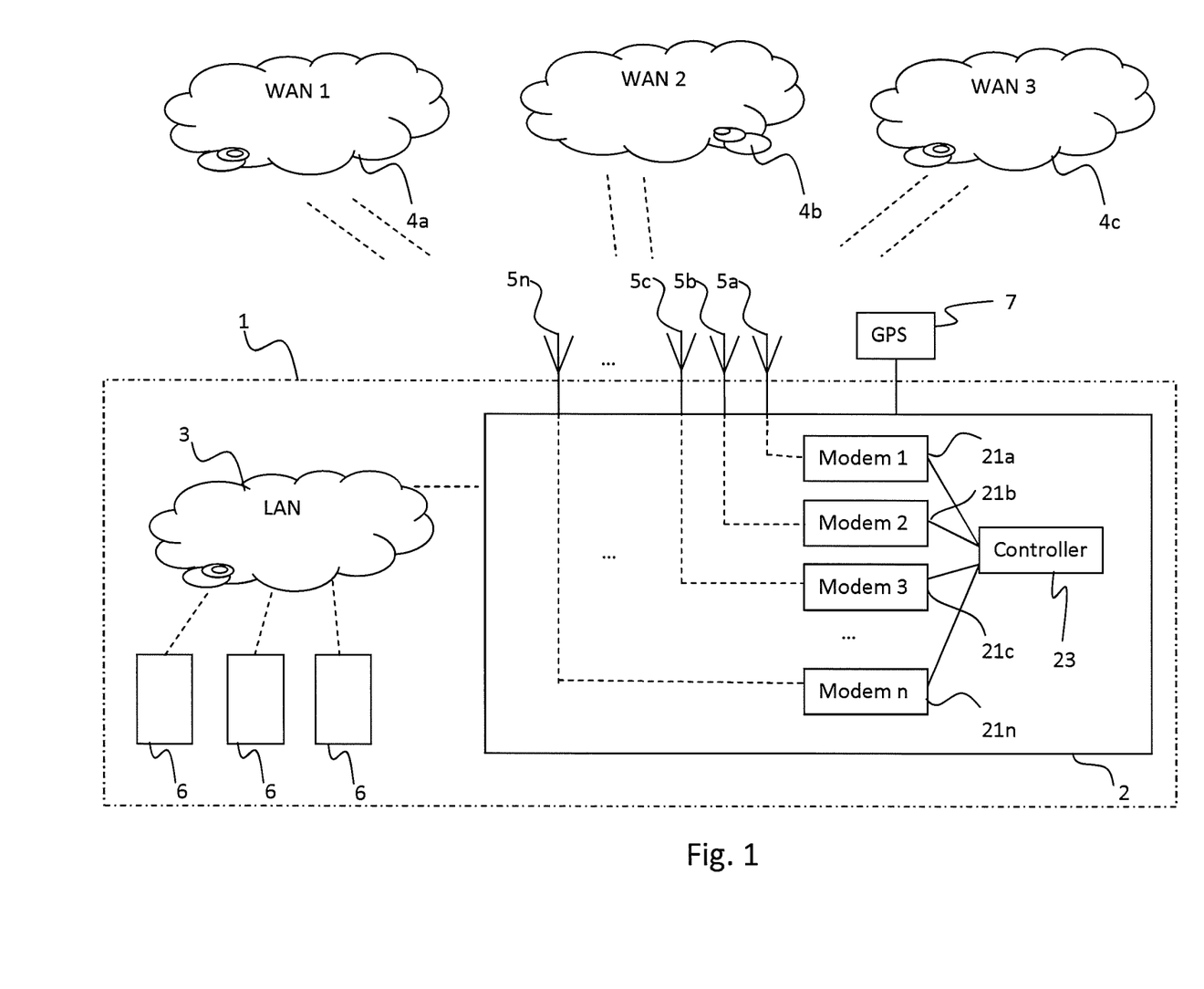
FIG. 1 is a schematic illustration of a train having a wireless communication system in accordance with an embodiment of the present invention.

In FIG. 1 a schematic illustration of a vehicle 1, such as a train, having a communication system is provided. The communication system comprises a data communication router 2 for receiving and transmitting data between an internal local area network (LAN) 3, and one or several external wide area networks (WANs) 4a, 4b, 4c, including two types of external wireless networks, a first external wireless network type comprising a plurality of trackside base stations, such as access points, for communication in compliance with a Wireless Local Area Network (WLAN), the trackside base stations being arranged in the vicinity of a vehicle path of travel, such as a train route—in the following referred to as WLAN or trackside network—and a second external wireless network type communicating via cellular network standard(s), such as in accordance with 3G, 4G or 5G standards—in the following referred to as cellular network. The trackside network preferably comprises a plurality of trackside base stations/access points distributed along a vehicle path of travel, preferably for communication in compliance with a Wireless Local Area Network (WLAN) standard, such as an 802.11 standard.

Communication to and from the WANs is provided through one or several antennas 5a-n arranged on the train, the antennas may be arranged on the roof of the train, on window panes of the train, etc. Two or more external wireless networks are preferably available, either between the train and one of the WANs, and/or by using several WANs simultaneously.

The LAN is preferably a wireless network, using one or several internal antennas to communicate with terminal units 6 within the vehicle. It is also possible to use a wired network within the vehicle. The LAN may be set-up as wireless access point(s). The client(s) 6 may be computing devices such as laptops, mobiles telephones, PDAs, tablets and so on.

The data communication router further preferably comprises a plurality of modems 21a-n. Assignment of data streams to different WANs and/or to different data links on one WAN is controlled by a router controller 23. The router controller 23 is preferably realized as a software controlled processor. However, the router controller may alternatively be realized wholly or partly in hardware.

The system may also comprise a receiver for receiving GNSS (Global Navigation Satellite System) signals, such as a global positioning system (GPS) receiver 7 for receiving GPS signals, indicative of the current position of the vehicle, and wherein the controller may be arranged to control in particular the performance of the communication with the trackside base stations in accordance with the vehicle position determined based on the GNSS/GPS signals.

The data communication router may also be denominated MAR (Mobile Access Router) or MAAR (Mobile Access and Applications Router).

Figure 2:
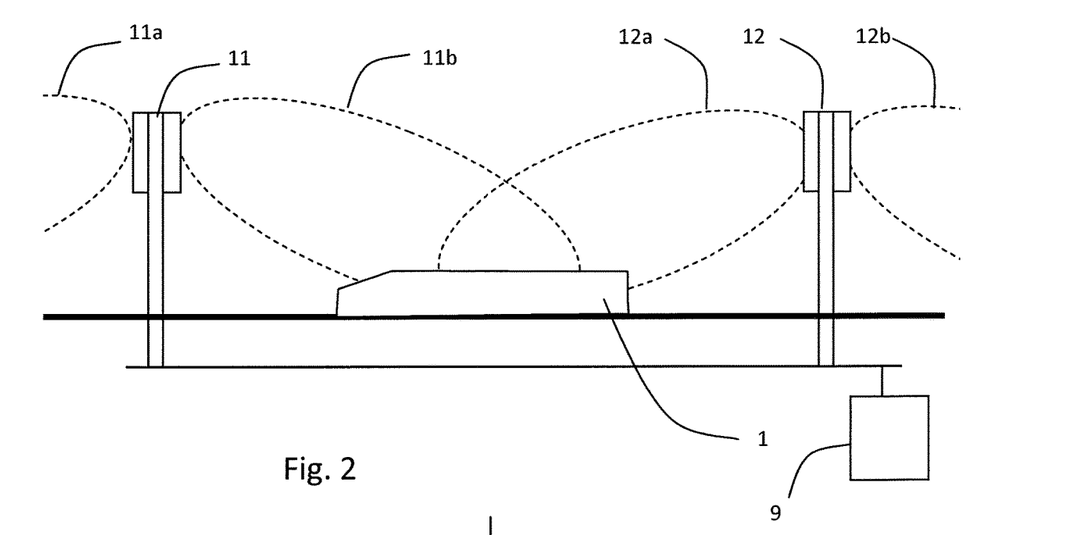
FIG. 2 is a schematic illustration of a train being associated with two trackside base stations of an external mobile network, in accordance with an embodiment of the present invention.

In FIG. 2, the trackside network a plurality of trackside base stations, such as trackside access points, are provided, distributed along a vehicle path of travel, i.e. the rail, for communication in compliance with a Wireless Local Area Network (WLAN) standard, such as an 802.11 standard, is illustrated in more detail. The external mobile network comprises a plurality of trackside base stations 11, 12, arranged along the vehicle path. The base stations have coverage areas 11a, 11b, 12a, 12b extending in both directions along the vehicle path. The coverage areas on the two sides of the base stations may be related to the same base station/access point, or to different base stations/access points. Thus, coverage area 11a and 11b may be related to the same base station/access point, or be operated independently, as different base stations/access points, and the same applies to coverage areas 12a and 12b, etc.

The base stations/access points are connected to a controller 9, via a wired or wireless connection, such as via a fiber connection. The controller is preferably realized on a processor, and at least partly in software. However, the controller may also be realized on several processors, in a distributed fashion. Further, the controller may alternatively be arranged in, or connected to, the mobile router 2.

The mobile router is also connected to other external networks, in particular cellular networks, and may consequently simultaneously distribute the communication also over these networks.

The data communication router is preferably arranged to communicate on at least two different communication routes having different characteristics, such as on two or more trackside networks, two or more cellular networks, or at least one trackside network in combination with at least one cellular network. Hereby, the communication can be automatically optimized based on specific conditions, such as price, speed, etc. Such data communication routers operating on multiple simultaneous links are e.g. known from EP 1 175 757 by the same applicant, said document hereby incorporated by reference. Such routers are also commercially available from the applicant, Icomera AB. Hereby, the router may use all available data channels, such as two or more of e.g. Satellite, DVB-T, HSPA, EDGE, 1×RTT, EVDO, LTE, LTE-A, WiFi (802.11), Ethernet and WiMAX; and combine them into one virtual network connection. An automatic selection may be made among the available channels to use the most cost effective combination that fulfils the users' availability, bandwidth and reliability requirements. Hence, a seamless distribution of the data among said different channels can be obtained.

Figure 3:
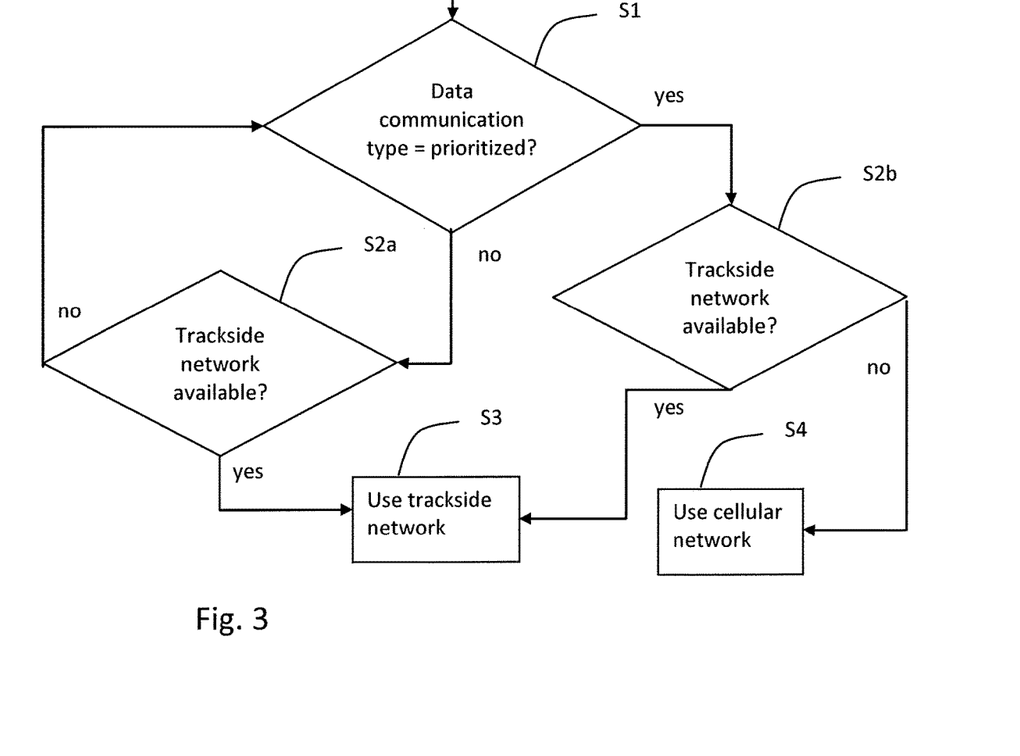
FIG. 3 is a flow chart illustrating the method in accordance with one embodiment of the present invention.

FIG. 3 is a schematic illustration of a simplified embodiment of the present invention. Here, a data communication type is first determined for each data stream to be transmitted, as illustrated in step S1. The data communication types are associated with various prioritization, so that certain data communication types are considered prioritized, i.e. having high priority, whereas other are considered non-prioritized, i.e. having low priority. The methods to identify and distinguish various types of data communication, and the rules to assign prioritization are per se known. For example, it is possible to identify voice communication, and to assign such data communication to a high priority. The same may apply to VPN communication. Non-identified data communication may, as a default, be assigned to a low priority. Alternatively, low priority data communication types may be identified, such as http communication, video communication, gaming communication and the like, and remaining, unidentified data communication types may, as a default, be assigned to high priority. It is also possible to identify data communication types of both high and low priority, and to assign unidentified data communication to either high or low priority.

In the illustrative example, data communication types are assigned either to high or low priority. However, further levels of prioritization may also be provided, such as three, four, five or more levels.

In case a low priority data communication type has been determined, the next step S2a determines whether a trackside network is available. If so, the data communication is allowed without restrictions over the trackside network, step S3, and may also be used for buffering and the like, which is e.g. useable when streaming video data.

If the data communication has low priority and trackside networks are not available, the request is returned to step S1, possibly after a certain waiting time, and the process is repeated until a trackside network has been determined to be available.

In case a high priority data communication type has been determined, the next step S2b similarly determines whether a trackside network is available. If so, the data communication is allowed without restrictions, and preferably partly or solely over the trackside network, step S3. If the data communication has high priority and trackside networks are not available, the data communication will be made over the cellular network, step S4.

In the above-illustrated embodiment, the low priority data communication is allowed without restrictions over the trackside network, when available, and prohibited over the cellular network. However, it is also possible to allow some or all low priority data communication also over the cellular network, but with restricted bandwidth or the like. Similarly, the high priority data communication is in the illustrative example forwarded over the trackside network when available, and otherwise over the cellular network. However, the high priority data may alternatively be forwarded only over the cellular network, or by any combination of the cellular and trackside networks.

Further, in the illustrative example, the method first identifies the data communication type, and its associated priority, and thereafter determines the availability of the trackside network. However, these steps may also be performed in the opposite order.

Figure 4:
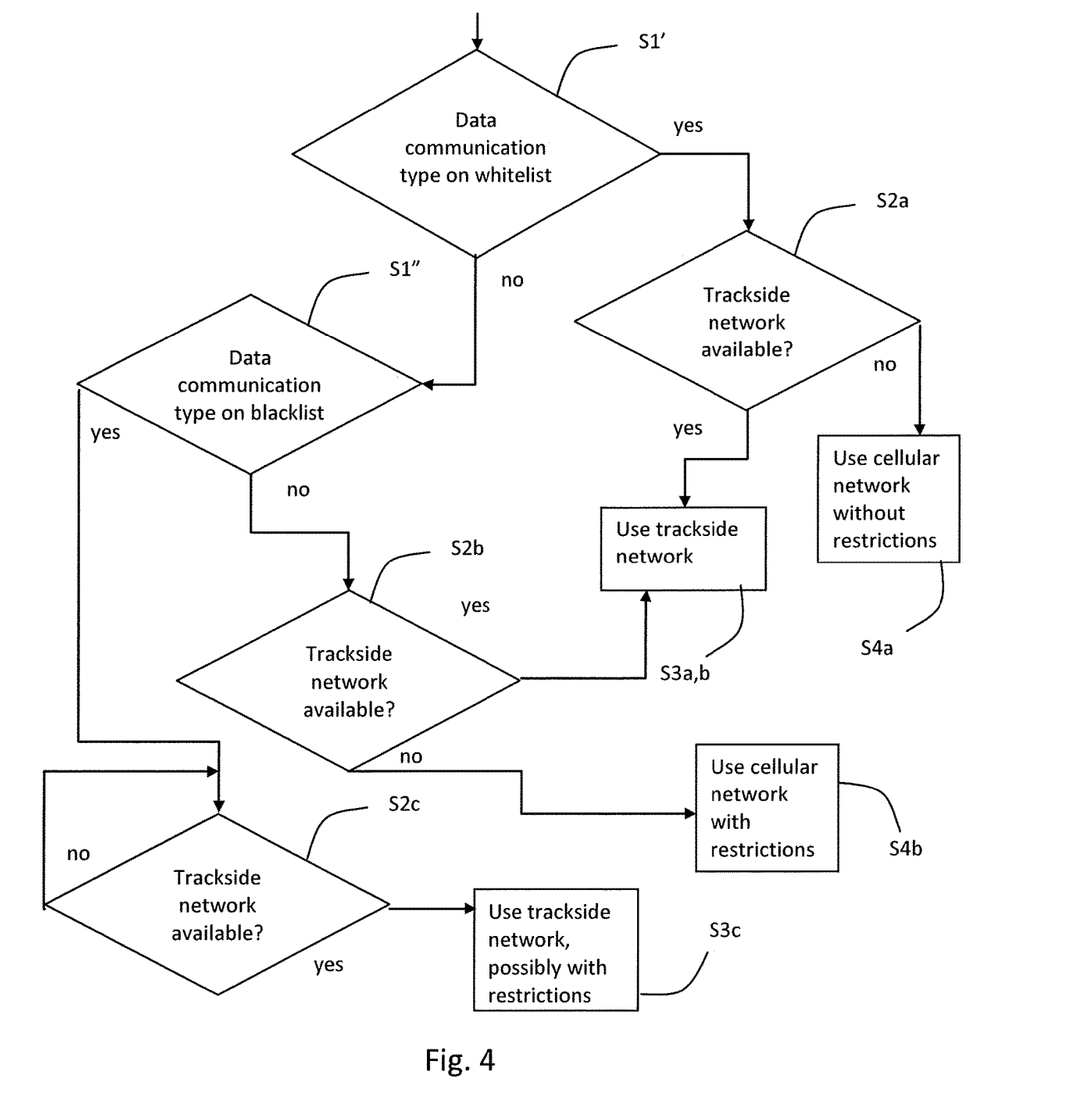
FIG. 4 is a flow chart illustrating the method in accordance with another embodiment of the present invention.

FIG. 4 is a schematic illustration of another simplified embodiment of the present invention. In this illustrative example, data communication types are assigned either to high priority ("whitelisted"), normal or low priority ("blacklisted"). However, further levels of prioritization may also be provided, such as four, five or more levels. Further, the whitelist and blacklist need not be used in combination—it is also possible to use only a whitelist, to provide the two data communication types "whitelisted" and normal, or only a blacklist, to provide the two data communication types normal and "blacklisted".

Here, it is first determined whether the stream has a destination address, output port, or the like, included on a whitelist, step S1'. If this is the case, the data stream is identified as whitelisted, i.e. a highly prioritized data communication type. If it is also determined that a trackside network is available, step S2a, the data stream is forwarded via this trackside network without any restrictions, step S3a. If no trackside network is available, the data stream is instead forwarded over the cellular network, again without any restrictions, step S4a.

If it is determined that the destination address, output port, or the like, is not included on the whitelist in step S1', it is then determined whether the stream has a destination address, output port, or the like, included on a blacklist, step S1". If this is the case, the data stream is identified as blacklisted, i.e. a data communication type of lowest priority.

If the data stream has not been blacklisted, it is determined whether a trackside network is available, step S2b, and if so, the data stream is forwarded via this trackside network without any restrictions, step S3b, or with limited restrictions. If no trackside network is available, the data stream is instead forwarded over the cellular network, but with restrictions, such as restricted bandwidth, step S4b.

If the data stream has been blacklisted, it is determined whether a trackside network is available, step S2c, and if so, the data stream is forwarded via this trackside network, step S3c. However, there may be some restrictions on this data transfer, such as limitations in bandwidth. If no trackside network is available, the blacklisted data stream is not allowed to communicate over the cellular network. Instead, the process is held in a waiting loop, awaiting the next time a trackside network is available.

As before, other restrictions etc may be assigned to the different types of data (normal, whitelisted and blacklisted), the steps may be performed in different order, etc.

Figure 5:
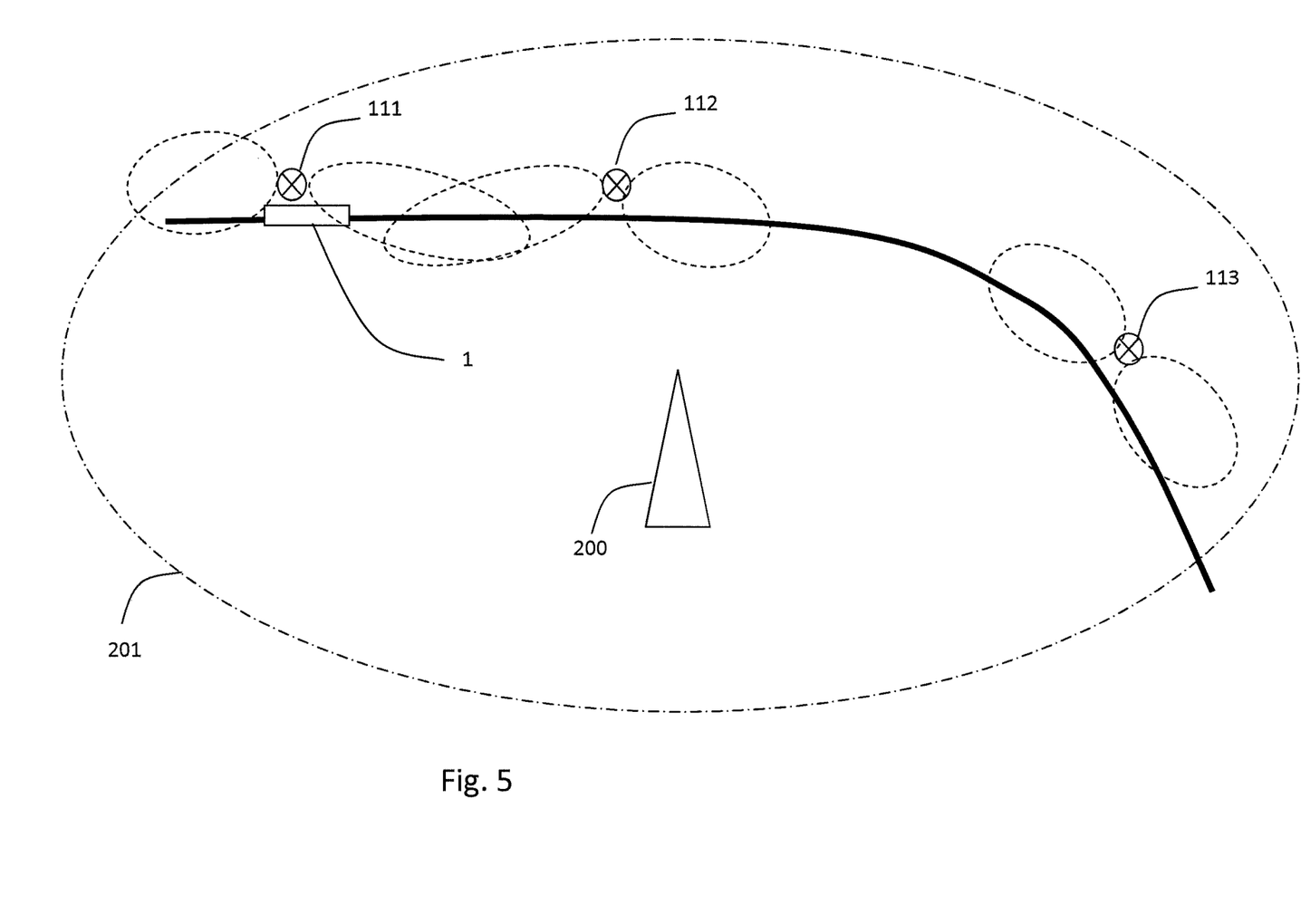
FIG. 5 is a schematic illustration of a train being associated with both a trackside network and a cellular network during travel, in accordance with an embodiment of the present invention.

An exemplary embodiment for communicating with the trackside base stations/access points will now be described with reference to FIG. 5.

Here, a train 1 travels on a railway track, along which a plurality of trackside base stations 111-116 are located. In the position of the train as indicated in FIG. 4, the train is within the coverage area of base station 111. The position and direction of travel for the train may be determined by the controller 9, for example based on information, such as GNSS/GPS information, received from the mobile router on the train, and/or information received from the trackside base stations.

Here, it is determined by the controller that the train is in the coverage area of trackside base station 111, and travelling towards trackside base station 112. As a result, the controller sends control instructions to the base station 112 to continue with the data transmission. In this state, all data communication, regardless of priority, is allowed, and takes place over the trackside network.

As the train moves forward, it will leave the coverage area of trackside base station 112, and enter into an area without access to a trackside network. In this area, only a cellular network is available, based on the coverage area 201 from cellular base station 200. In this area, only prioritized data communication will be forwarded.

After a while, the train will enter into the coverage area of trackside base station 113, and again data transmission will be allowed for all requested data communication, regardless of priority.

In case the train is within the coverage area of several trackside base stations, the data communications may be divided between these trackside base stations. Similarly, in case the train is within the coverage area of several cellular base stations, the data communication may be divided between these cellular base stations. It is also possible to allow some high priority data communication over the cellular network even when the train has access to a trackside network.

The invention has now been described with reference to specific embodiments. However, several variations of the communication system/method are feasible. For example, the present invention has here been disclosed in relation to trains, where it is considered to be particularly advantageous. However, it may also be implemented and used on other moving vehicles, and in particular vehicles intended for passenger traffic, such as buses, ferries, airplanes, etc. Further, the examples are mostly related to the 802.11 standard, but other WLAN protocols may also be used in the same or similar ways, and it is also possible to use the same method and system for communication in compliance with other communication protocols and standards, such as unlicensed LTE, licensed LTE, GSM-R, etc.

Further, the above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A method for wireless communication between a mobile router in a moving vehicle and one or several external server(s) via at least two types of external wireless networks, a first external wireless network type comprising a plurality of trackside base stations for communication in compliance with a Wireless Local Area Network (WLAN) standard, said trackside base stations being arranged in the vicinity of a vehicle path of travel and a second external wireless network type communicating via cellular network standard(s), wherein the mobile router is arranged, at least periodically, to simultaneously communicate with the two types of external wireless networks thereby providing at least two concurrently useable external wireless networks, the method comprising:
- identifying for data streams to or from said mobile router a data communication type, said data communication type being selected from a set of at least two different data communication types, each data communication type being associated with a specific prioritization;
- determining the availability of external wireless network(s) of the first of said external wireless network types, and, when good availability of such external wireless network(s) has been determined, allowing communication through this external wireless network(s) for all different data communication types with no or limited restrictions, and when it has been determined that such an external wireless network(s) of the first external wireless network type is not available, allowing communication through external wireless network(s) of said second external network type based on prioritization, wherein data communication types of highest priority is allowed with no restrictions, whereas data communication types of lower priority is restricted or prohibited;
- wherein, when it has been determined that external wireless network(s) of the first of said external wireless network types is available, but with limited capacity, allowing communication through this external wireless network(s) for all different data communication types, but with restrictions for data communication types having lower priority;
- wherein the mobile routers are arranged to receive GNSS data and communicate this to the external wireless network, said GNSS data being useable to determining the availability of external wireless network(s) of the first of said external wireless network types;
- wherein the trackside base stations are arranged to send information to a control server about mobile routers being determined to be within their access area;
- wherein the control server is arranged to determine the direction of travel of each mobile router based on the position data from each mobile router; and
- wherein the mobile router is arranged to simultaneously communicate with the external wireless network through two or more external wireless networks of the first type.

2. The method of claim 1, wherein the step of identifying a data communication type comprises identification of whether the data stream is at least one of voice-over-IP (VOIP) and VPN, and the assigning the data stream to a data communication type of high priority.

3. The method of claim 1, wherein the step of identifying a data communication type comprises determining whether the data stream involves a HTTP or HTTPS communication, and if so to assign the data stream to a data communication type of low priority.

4. The method of claim 1, wherein the step of identifying a data communication type comprises comparing at least one of a destination address of said data stream and an output port of said data stream with a whitelist comprising at least one predefined address or port, and assigning a higher priority to said data streams in case of a match.

5. The method of claim 1, wherein the step of identifying a data communication type comprises comparing at least one of a destination address of said data stream and an output port of said data stream with a blacklist comprising at least one predefined address or port, and assigning a lower priority to said data streams in case of a match.

* * * * *